United States Patent [19]

Kamakura et al.

[11] Patent Number: 5,543,454
[45] Date of Patent: Aug. 6, 1996

[54] REINFORCED POLYPROPYLENE RESIN COMPOSITION

[75] Inventors: Hikoichi Kamakura, Matsudo; Kiyoshi Tsutsui, Osaka; Tomohiko Akagawa, Osaka; Ikunori Sakai, Osaka; Shigeji Ichikawa; Katsunori Arai, both of Omiya, all of Japan

[73] Assignees: Ube industries, Ltd., Yamaguchi; Kansei Corp., Saitama, both of Japan

[21] Appl. No.: 285,627

[22] Filed: Aug. 4, 1994

[30] Foreign Application Priority Data

Aug. 10, 1993 [JP] Japan ................... 5-198300

[51] Int. Cl.⁶ .................. C08K 3/34; C08L 53/02
[52] U.S. Cl. ................. 524/451; 524/505; 525/88; 525/89; 525/98
[58] Field of Search ................... 524/451, 505; 525/88, 89, 98

[56] References Cited

U.S. PATENT DOCUMENTS

| | | | |
|---|---|---|---|
| 5,086,109 | 2/1992 | Ueno et al. | 524/451 |
| 5,247,003 | 9/1993 | Tereda et al. | 524/451 |
| 5,308,908 | 5/1994 | Fukui et al. | 524/451 |

FOREIGN PATENT DOCUMENTS

| | | |
|---|---|---|
| 58-168649 | 10/1983 | Japan. |
| 61-291247 | 12/1986 | Japan. |
| 63-150343 | 6/1988 | Japan. |
| 3-172339 | 7/1991 | Japan. |
| 4-57848 | 2/1992 | Japan. |

*Primary Examiner*—Thurman K. Page
*Assistant Examiner*—Olga Asinovsky
*Attorney, Agent, or Firm*—Armstrong, Westerman Hattori, McLeland & Naughton

[57] ABSTRACT

A reinforced polypropylene resin composition contains the following components (A), (B) and (C) in amounts of 67 to 82% by weight of, 6 to 12% by weight and 12 to 21% by weight, respectively:

Component (A): crystalline ethylene-propylene block copolymer having an ethylene content of 2 to 4% by weight, a molecular distribution of polypropylene component ($Q=M_w/M_n$) of at least 7, isotacticity of polypropylene component of at least 98%, an intrinsic viscosity (decalin, 135° C.) of room temperature p-xylene soluble content of at least 6 dl/g, a melt flow rate (MFR) of 3 to 15 g/10 minutes, and the product of flexural modulus at room temperature and Izod impact strength at room temperature of at least 120000.

Component (B): at least one elastomer selected from the group of consisting of (a) hydrogenated block copolymer rubbers each comprising block (I) composed of an aromatic vinyl compound copolymer and block (II) composed of a conjugated diene copolymer, and having a bonding structure of I-II or I-(II-I)$_n$ (wherein n=1 or 2), wherein block (I) is contained in an amount of 10 to 40% by weight of the copolymer and is hydrogenated in an amount of 10 mol % or less, and block (II) is contained in an amount of 60 to 90% by weight of the copolymer and is hydrogenated in an amount of at least 90 mol %; and (b) ethylene-α-olefin copolymer rubbers each containing 30 to 95% by weight of ethylene.

Component (C): talc having an average particle size of 3 to 5 μm, which is measured by a laser diffraction method, a BET specific surface area of 5 to 13 m²/g, and a top cut size of less than 20 μm.

9 Claims, No Drawings

REINFORCED POLYPROPYLENE RESIN COMPOSITION

BACKGROUND OF THE INVENTION

1. Field of the Invention

The present invention relates to a reinforced polypropylene resin composition which has a light weight, excellent rigidity, heat distortion resistance and impact resistance, and which permits the formation of a large molded product having excellent dimensional stability and appearance in a short molding cycle. The reinforced polypropylene resin composition of the present invention is suitably used in the field of large automobile parts such as an instrument panel and so on.

2. Description of the Related Art

Traditionally, a reinforced polypropylene resin composition comprising a polypropylene resin as a main component in combination with thermoplastic elastomer and an inorganic filler was generally used for automobile parts within a wide range. The required heat distortion resistance, impact resistance, dimensional stability and moldability of the reinforced polypropylene resin composition increase in level with expansion of the field of the application thereof. Investigation was thus made for improving the properties by variously changing the polypropylene resin, thermoplastic elastomer and inorganic filler, which are contained in the reinforced polypropylene resin composition.

An example of such a reinforced polypropylene resin composition is a combination of a crystalline ethylene-propylene block copolymer having a specified ethylene content, MFR, p-xylene soluble content and intrinsic viscosity, ethylene-propylene copolymer rubber and inorganic filler having a specified average particle size (Japanese Patent Laid-Open No. 58-168649). Investigation was also made of a reinforced polypropylene resin composition comprising a combination of a crystalline ethylene-propylene block copolymer, a hydrogenated block copolymer rubber, ethylene-propylene copolymer rubber having a specified molecular structure and MFR, and an inorganic filler such as talc or the like (Japanese Patent Laid-Open Nos. 3-172339 and 61-291247). Various examinations were performed for the particle size, particle distribution, etc. of the talc added (Japanese Patent Laid-Open Nos. 63-150343 and 4-57848).

However, in recent automobiles, since the room temperature is easily increased due to the small inclination angle of the window glass, the demand for the heat distortion resistance of an instrument panel, etc is increased. On the other hand, the importance of light weight, improvement in the appearance and reduction in the molding time are also increased. However, previous proposed materials are difficult to comply with these demands over a wide range.

The present invention has been achieved in consideration of the above situation, and an object of the invention is to provide a reinforced polypropylene resin composition which can satisfy the above various requirements.

SUMMARY OF THE INVENTION

A reinforced polypropylene resin composition of the present invention comprises the following components (A), (B) and (C) in amounts of 67 to 82% by weight, 6 to 12% by weight and 12 to 21% by weight, respectively:

Component (A):
Crystalline ethylene-propylene block copolymer having an ethylene content of 2 to 4% by weight, a molecular distribution of polypropylene component ($Q=M_w/M_n$) of at least 7, isotacticity of polypropylene component of at least 98%, an intrinsic viscosity (decalin, 135° C.) of room temperature p-xylene soluble matter of at least 6 dl/g, a melt flow rate (MFR) of 3 to 15 g/10 minutes, and the product of flexural modulus at room temperature and Izod impact strength at room temperature of at least 120000.

Component (B):
At least one elastomer selected from the group of consisting of (a) hydrogenated block copolymer rubbers each comprising block (I) composed of an aromatic vinyl compound copolymer and block (II) composed of a conjugated diene copolymer, and having a bonding structure of I-II or I-(II-I)$_n$ (wherein n=1 or 2), wherein block (I) is contained in an amount of 10 to 40% by weight of the copolymer and is hydrogenated in an amount of 10 mol % or less, and block (II) is contained in an amount of 60 to 90% by weight of the copolymer and is hydrogenated in an amount of at least 90 mol %; and (b) ethylene-α-olefin copolymer rubbers each containing 30 to 95% by weight of ethylene.

Component (C):
Talc having an average particle size of 3 to 5 μm, which is measured by a laser diffraction method, a BET specific surface area of 5 to 13 m$^2$/g, and a top cut size of less than 20 μm.

Each of the components is described below.

Component (A)

The component (A) used in the present invention is a crystalline ethylene-propylene block copolymer which satisfies the following requirements:

The ethylene content is 2 to 4% by weight, preferably 2.5 to 4% by weight. With an ethylene content of less than 2% by weight, a reinforced polypropylene composition having excellent impact resistance cannot be obtained. While, with an ethylene content over 4% by weight, a molded product having excellent heat distortion resistance cannot be obtained. The ethylene content can be determined by a calibration method using the absorbance of the characteristic absorption of a methyl group (—CH$_3$) and methylene group (—CH$_2$—) on an infrared absorption spectrum of component (A).

The room temperature p-xylene insoluble matter, i.e., polypropylene component, must have a molecular weight distribution ($Q=M_w/M_N$) of at least 7. With a Q value of less than 7, there is the problem that flow marks easily occur in the molded product. The isotacticity must be at least 98%. With isotacticity of less than 98%, a molded product having sufficient heat distortion resistance cannot be obtained due to insufficient stereoregularity, and there is the problem of a long molding cycle. The molecular weight distribution of the polypropylene component can be measured by gel permeation chromatography (GPC), and the isotacticity as an index for indicating the stereoregularity of a polypropylene resin can be calculated from the infrared absorption spectrum.

The room temperature p-xylene soluble matter (comprising an amorphous ethylene-propylene copolymer and low-molecular weight polymer) has an intrinsic viscosity (decalin, 135° C.) of at least 6 dl/g, preferably at least 7 dl/g. With an intrinsic viscosity of less than 6 dl/g, flow marks occur on the molded product, and cause the problem of deteriorating the appearance thereof.

The MFR (230° C., 2.16 kg) is 3 to 15 g/10 minutes, preferably 9 to 15 g/10 minutes. With a MFR of less than 3 g/10 minutes, a composition having good moldability cannot be obtained. With a MFR over 15 g/10 minutes, a composition having good impact resistance cannot be obtained.

The crystalline ethylene-propylene block copolymer as component (A) must have a high degree of balance between rigidity and impact resistance. Specifically, the product of flexural modulus at room temperature and Izod impact strength at room temperature should be at least 120000, preferably at least 130000.

Although the rigidity is generally increased by adding an inorganic filler such as talc or the like, the impact resistance is liable to decrease by adding an inorganic filler. The addition of elastomer increases the impact resistance, but it decreases the rigidity. When the amount of the talc added is limited, the balance between the physical properties of the crystalline ethylene-propylene block copolymer has great significance. If the product of flexural modulus at room temperature ($kg/cm^2$) and Izod impact strength (kg.cm/cm) is less than 120000, a composition which is good in both impact resistance and rigidity cannot be obtained.

At least two crystalline ethylene-propylene block copolymers may be used as component (A). A crystalline ethylene-propylene block copolymer which is graft-modified by adding an unsaturated organic acid or derivative thereof may be used. However, in such cases, component (A) as a whole should satisfy the above requirements.

Component (B)

At least one elastomer selected from hydrogenated block copolymer rubbers, ethylene-α-olefin copolymer rubbers is used as component (B).

Hydrogenated block copolymer rubber is a rubber-like block copolymer comprising 10 to 40% by weight of aromatic vinyl compound copolymer block (I) (referred to as "block (I)" hereinafter) and 60 to 90% by weight of conjugated diene polymer block (II) (referred to as "block (II) hereinafter), and having a structure represented by I-II or I-(II-I)$_n$ (wherein n=1 or 2). Block (I) is hydrogenated in an amount of 10 mol % or less, and block (II) is hydrogenated in an amount of 90 mol % or more. Typical examples of such rubbers are hydrogenated styrene rubbers such as hydrogenated styrene-butadiene-styrene copolymer, hydrogenated styrene-isoprene-styrene copolymer and the like.

Preferred examples of block (I) include styrene polymers such as polystyrene, poly-α-methylstyrene, poly-p-methylstyrene, polybromostyrene, polychlorostyrene, and the like. Of there polymers, polystyrene and poly-α-methylstyrene are preferred. Preferred examples of block (II) include polybutadiene, polyisoprene, polychloroprene and the like. Of these polymers, polybutadiene and polyisoprene are preferred.

The ratio of block (I) is 10 to 40% by weight, preferably 10 to 30% by weight. If the ratio of block (I) is less than 10 by weight, a reinforced polypropylene resin composition having high rigidity cannot be obtained. With a ratio over 40% by weight, a reinforced polypropylene resin composition having excellent impact resistance cannot be obtained.

In the hydrogenated block copolymer rubber, the ratio of hydrogenation of block (I) is 10 mol % or less, preferably 5 mol % or less, and the ratio of hydrogenation of block (II) is 90 mol % or more, preferably 97 mol % or more. If the ratio of hydrogenation of block (I) exceeds 10 mol %, there is the problem that a composition having excellent rigidity and heat resistance cannot be obtained. If the ratio of hydrogenation of block (II) is less than 90 mol %, there is the problem that the resultant molded product exhibits poor weathering resistance.

Such hydrogenated rubbers are available as Kraton G (produced by Shell Chemical Co., Ltd.), Tuftec (produced by Asahi Chemical Industry Co., Ltd.), Septon (Kuraray Co., Ltd.) and so on.

Ethylene-α-olefin copolymer rubber contains 30 to 95% by weight, preferably 60 to 90% by weight, of ethylene. An ethylene content of less than 30% by weight, since the glass transition temperature (Tg) of ethylene-α-olefin copolymer rubber is increased, a composition comprising such copolymer rubber exhibits poor impact resistance at a low temperature. On the other hand, with an ethylene content over 95% by weight, since ethylene-α-olefin copolymer rubber approximates to polyethylene, the compatibility with other components deteriorates. Examples of α-olefin components include compounds having 3 to 20 carbon atoms, Such as propylene, 1-butene, 1-pentene, 1-hexene, 4-methyl-1-pentene, 1-decene and the like. These α-olefin components may be singly used or in a mixture of at least two components. The α-olefin component may contain a small amount of diene component.

At least one rubber selected from the above hydrogenated block copolymer rubbers and α-olefin copolymer rubbers can be used as component (B).

Component (C)

Component (C) is talc which satisfies the above requirements. Namely, talc satisfies the requirements that the average particle size measured by the laser diffraction method is 3 to 5 μm, the top cut size is less than 20 μm, and the BET specific surface area is 5 to 13 $m^2/g$.

Fine talc having an average particle size of less than 3 μm produces secondary agglomeration in a resin, the rigidity of a reinforced polyprolylene composition is not sufficiently improved, and the impact resistance significantly deteriorates. When a talc having an average particle size over 5 μm is used, similarly, the rigidity of a reinforced polypropylene composition is not sufficiently improved, and the impact resistance deteriorates.

If the top cut size, i.e., the particle size of maximum particles contained in the talc, is 20 μm or more, since the ratio of large particles contained in talc is increased, the impact resistance of the resultant molded product significantly deteriorates.

When talc having a BET specific surface area of less than 5 $m^2/g$ is used, the rigidity of the reinforced polypropylene resin composition is not sufficiently improved, and the impact resistance significantly deteriorates. Since talc having a BET specific surface ares over 13 $m^2/g$ contains only a small amount of fine particles, the talc easily absorbs water in air and produces secondary agglomeration. When such talc is used, the rigidity of the reinforced polypropylene resin composition is not sufficiently improved, and the impact resistance significantly deteriorates.

The BET specific surface area can be determined from the amount of nitrogen physically adsorbed on talc at the liquid nitrogen temperature (77° K.) based upon the BET theory.

The talc which satisfies the above requirements can be produced by a method of grinding talc raw ore to an average particle size near a predetermined value using a known grinding machine such as a roller mill, a crusher or the like, and removing particles having sizes other than the average particle size of 3 to 5 μm by classification to obtain particles having a specific surface area within the range of 5 to 13 $m^2/g$. Classification can be carried out by using a known classifier. The ground particles may be classified while being ground again by a known grinding machine.

Talc which is subjected to surface treatment with various surface treatment agents can also be used. Examples of surface treatment agents include various treatment agents such as silane coupling agents, higher fatty acids, fatty acid metal salts, unsaturated organic acids or derivatives thereof, organic titanates, resin acids, polyethylene glycol ether and so on. Possible surface treatment methods include chemical or physical surface treatment methods using the surface treatment agent.

The ratios of components (A), (B) and (C) are within the ranges of 67 to 82% by weight, 6 to 12% by weight, and 12 to 21% by weight, preferably 71 to 78% by weight, 6 to 10% by weight, and 15 to 20% by weight, respectively.

Since the composition of the present invention contains components (B) and (C) in amounts which are limited to specified ranges, the amount of component (A) is determined by the amounts of components (B) and (C).

A ratio of component (B) of less than 6% by weight makes it impossible to obtain a composition having good impact resistance, while a ratio over 12% by weight makes it impossible to obtain a composition having high rigidity. A ratio of component (C) of less than 12% by weight makes it impossible to obtain a reinforced polypropylene resin composition having high rigidity, while a ratio over 21% by weight excessively increases the specific gravity of the composition obtained, and thus makes it impossible to obtain a lightweight molded product.

Components (A) to (C) may be melted and kneaded directly by using a Banbury mixer, a roller, a monoaxial extruder, a biaxial extruder, a kneader or a kneading extruder, or may be melted and kneaded after previously mixed by a batch mixer such as a V blender or the like.

The reinforced polypropylene resin composition of the present invention can contain additives such as an antioxidant, an ultraviolet absorber, a light stabilizer, pigment, a dispersant, a coating property modifier, a moldability modifier, an antistatic agent, a lubricant, a nucleating agent and a mold release agent. It is particularly preferred to add an antioxidant, an ultraviolet absorber, a light stabilizer, and a pigment. The additives may be mixed with the reinforced polypropylene resin composition at the same time or after the components of the composition are kneaded.

Examples of antioxidants include 2,6-di-tert-butyl phenol, 2,6-di-tert-butyl-4-ethyl phenol, 2,6-di-tert-butyl-4-n-butyl phenol, 2,6-di-tert-butyl-α-dimethylamino-p-cresol, 6-(4-hydroxy-3,5-di-tert-butylianilino)-2,4-bisoctyl-thio-1,3,5-triazine, n-octadecyl-3-(4'-hydroxy-3',5-di-tert-butylphenyl) propionate, 2,6-di-tert-butyl-4-methyl phenol, tris-(2-methyl-4-hydroxy-5-tert-butylphenyl) butane, tetrakis-[methylene-3-(3',5'-di-tert-butyl-4'-hydroxyphenyl) propionate] methane, 1,3,5-trimethyl-2,4,6-tris(3,5-di-tert-butyl-4-hydroxybenzyl) benzene, dilaurylthiodipropionate and the like.

Examples of ultraviolet absorbers and light stabilizers include 2-hydroxy-4-n-octoxybenzophenone, 2-hydroxy-4-octadecyloxybenzophenone, 4-dodecyloxy-2-hydroxybenzophenone, 2-(2'-hydroxy-3'-tert-butyl-5'-methylphenyl)-5-chlorobenzotriazole, bis(2,2,6,6-tetramethyl-4-piperidyl) sebacate, 1,2,2,6,6-pentamethyl-4-piperidinol tridecylalcohol condensation products of 1,2,3,4-butanetetracarboxylic acid and the like.

EXAMPLES

Although the present invention is described in detail below with reference to examples and comparative examples, the present invention is not limited to these examples.

(1) The crystalline ethylene-propylene block copolymer (component (A)), elastomer (component (B)) and talc (component (B)) which are used in each of examples and comparative examples are shown in Tables 1 to 3. The physical properties of components (A) and (C) were measured by the following method:

1. Component (A)

(a) Measurement conditions for molecular weight distribution of polypropylene component:

GPC: produced by Waters Co., 150C model

Column: produced by Showadenko K. K. Shodex AT-80M/S

Sample amount: 400 μl (polymer concentration 0.15% by weight)

Liquid amount: 1 l/min.

Temperature: 135° C.

Solvent: o-dichlorobenzene

A Calibration curve for the eluate volume and molecular weight was formed by using standard polystyrene produced by Toyosoda Co., Ltd. The weight average molecular weight ($M_W$) and number average molecular weight ($M_N$) in terms of polystyrene of a sample were determined by using the calibration curve, and Q value ($=M_W/M_N$) as a measure for molecular weight distribution was determined.

(b) Measurement conditions for isotacticity of polypropylene component (i) Summary:

After a film to be measured was heat-treated at 140° C., the infrared absorption spectrum of the film was measured by a infrared spectrophotometer. The isotacticity was calculated from the ratio between the values of absorbance at 998 cm$^{-1}$ and 974 cm$^{-1}$ on the obtained spectrum.

(ii) Molding of film to be measured:

100 mg of sample was placed between two ferro-plates, and molded in a thickness of about 35 to 40 μm by hot press.

| Heating plate temperature: | |
|---|---|
| Melt flow rate of at least 5 g/10 minutes | 200° C. |
| Melt flow rate of less than 5 g/10 minutes | 220° C. |

Pressure: 150 kg/cm$^2$

Pre-heating time: (no pressure in hot plates) 2 min.

Pressing time: 1 min.

Cooling time: 1 min.

Cooling water temperature: room temperature (iii) Heat treatment of film to be measured A film to be measured was cut in about 20 mm×40 mm, and was placed in a glass tube, followed by heat treatment for 6 hours under vacuum in the tube in a constant-temperature water bath controlled to a temperature of 140° C.±1° C. After heat treatment, the glass tube was taken out (under vacuum in the tube) and was allowed to stand at room temperature. After cooling, the sample was taken out and measured in an infrared absorption spectrum by an infrared spectrophotometer.

(iv) Calculation of isotacticity

A line connecting two points at 1080 cm$^{-1}$ and 920 cm$^{-1}$ on the measured infrared absorption spectrum was drawn, and absorbencies at 998 cm$^{-1}$ and 974 cm$^{-1}$ were determined by using the line as a base line according to the following equations 1:

Equation 1

$D_{998} = \ln(I_{0-998}/I_{998})$ $D_{974} = \ln(I_{0-974}/I_{974})$ (I: absorption intensity, $I_0$: reference absorption intensity, $D_{998}$: absorbance at 998 cm$^{-1}$, $D_{998}$: absorbance at 974 cm$^{-1}$)

The isotacticity was determined by the ratio between the obtained values of absorbance in accordance with the following equation 2:

Equation 2 isotacticity=$(D_{998}/D_{974}) \times 100$

2. Component (C)

The average particle size and top cut size of talc were determined by Fraunhofer's diffraction of forward scattered light of a laser beam source and side-way scattered light strength diffraction of a halogen light source using a microtrack particle size distribution meter (produced by Nikiso Co., Ltd., Model 7995-40 DRA).

The BET specific surface area was determined by the amount of nitrogen physically adsorbed on talc at the liquid nitrogen temperature (77° K.) on the basis of the BET theory. The amount of nitrogen adsorbed at the liquid nitrogen temperature was measured by using Monosoap MS-12 produced by Yuasa Ionix Co., Ltd.

(2) The physical properties of the composition were measured by the following methods:

1. Melt flow rate (MFR): according to JIS K7210 (230° C.)
2. Density: according to JIS K7112
3. Flexural modulus: according to JIS K7203
4. Izod impact strength (with notch): according to JIS K7110
5. Heat distortion temperature (load 4.6 kg/cm$^2$): according to JIS K7207

(3) The actual performance of the molded product was evaluated by the following methods:

1. Molding cycle:

The shortest molding cycle which allowed formation of good instrument panels having a length of 1450 mm, a width of 400 mm, a height of 350 mm and a weight of 3.5 kg by injection molding was considered as the molding cycle.

A molding machine IS-2500DN produced by Toshiba Kikai was used, and the molding temperature was 230° C.

2. Heat distortion resistance test:

The instrument panel was heated by an infrared lamp for 4 hours under the conditions that the surface temperature was 115° C., and the atmosphere temperature 80°±2° C., and was then allowed to stand at room temperature. After allowing to stand, the vertical distortions at the front end (garnish portion) and central portion of the instrument panel were measured.

3. Impact resistance test:

The instrument panel was hit with an aluminum head form (165 mmϕ, 6.8 kg) at a speed of 24 km/hr on the basis of FMVSS201, ECE No. 21. Testing device AL-150P produced by Itoh Seiki Co., Ltd. was used.

Impact resistance was evaluated as to whether or not occurrence acceleration continuously exceeds 80 G for 3 msec or more, and whether or not a sharp edge occurs, and with respect to the length of a crack on the back of the molded product.

4. Appearance of the molded product:

The occurrence of appearance defects such as flow marks, surface distortion, etc. on the surface of the instrument panel was examined.

TABLE 1

| | Component (A) (crystalline ethylene-propylene block copolymer) | | | | | | |
|---|---|---|---|---|---|---|---|
| | PP-1 | PP-2 | PP-3 | PP-4 | PP-5 | PP-6 | PP-7 |
| Ethylene content (wt %) | 3 | 7 | 1.5 | 5 | 3 | 3 | 3 |
| Molecular weight distribution of propylene component | 7.9 | 8.2 | 7.9 | 7.9 | 4 | 7.9 | 7.9 |
| % isotacticity (%) | 98.5 | 96.0 | 98.5 | 98.5 | 98.5 | 98.5 | 98.5 |
| Room-temperature p-xylene soluble matter [η] | 8 | 4 | 8 | 8 | 5 | 8 | 8 |
| MFR (g/10 min.) | 10 | 4 | 10 | 10 | 10 | 2 | 20 |
| The product of flexural modulus and Izod impact strength | 132000 | 100000 | 88000 | 126000 | 133500 | 160000 | 105000 |

TABLE 2

| | Component (B) (Hydrogenated block copolymer rubber) | | |
|---|---|---|---|
| Trade name | SEBS-1 Kraton G1657 | SEBS-2 Kraton G1650 | SEPS-1 Septon 2002 |
| Styrene block component (wt %) | 13 | 29 | 30 |

TABLE 3

| | Component (C) (Talc) | | | | | |
|---|---|---|---|---|---|---|
| | T-1 | T-2 | T-3 | T-4 | T-5 | T-6 |
| Average particle size (μm) | 4.1 | 2 | 6 | 6 | 2 | 5 |
| BET specific surface area (m$^2$/g) | 8.9 | 15 | 6 | 4 | 16 | 7 |
| Top cut size (μm) | 15 | 15 | 25 | 30 | 12 | 22 |

Example 1

Crystalline ethylene-propylene block copolymer (PP-1) having an ethylene content of 3% by weight, a molecular weight distribution (Q=$M_W/M_N$) of polypropylene component of 7.9, isotacticity of polypropylene component of 98.5%, intrinsic viscosity (decalin, 135° C.) of room temperature p-xylene soluble matter of 8 dl/g, a melt flow rate of 10 g/10 minutes, the product of room temperature flexural modulus and Izod impact strength of 132000 was used as component (A). Styrene block copolymer (SEBS-1) [produced by Shell Chemical Co., Ltd., trade name Kraton. G1657] was used as component (B). Talc (T-1) [produced by Calseed Co., Ltd.] having an average particle size of 4.1 μm, BET specific surface area 8.9 m$^2$/g, and a top cut size of 15 μm was used as component (C).

73% by weight of component (A), 10% by weight of component (B), 17% by weight of component (C), and an oxidizing agent were mixed by a rotary mixing machine, and then melted and kneaded by a biaxial kneading extruder to form pellets. The thus-formed pellets were molded in a specimen by an injection molding machine, and then tested in physical properties. The results obtained are shown in Table 4. The reinforced polypropylene resin composition was molded in an instrument panel, and then evaluated with respect to the molding cycle, heat distortion resistance, impact resistance, and appearance thereof. The results are shown in Table 6. The additives added were common to all examples and comparative examples below, and the amounts relative to 100 parts by weight of the resin composition were as follows:

2,6-tert-butyl-4-methyl phenol (antioxidant) . . . 0.1 parts by weight tetrakis-[methylene-3-(3',5'-di-tert-butyl-4'-hydroxyphenyl)propionate] methane (antioxidant) . . . 0.2 parts by weight Example 2

Pellets of a reinforced polypropylene resin composition were formed by the same method as that employed in Example 1 except that a styrene block copolymer (SEBS-2) [produced by Shell Chemical Co., Ltd., trade name Kraton G1650] having a styrene block component content of 13% by weight was used as component (B). The thus-formed pellets were molded in a specimen by an injection molding machine, and then evaluated with respect to the flexural modulus and Izod impact strength thereof. The results obtained are shown in Table 4.

Example 3

Pellets of a reinforced polypropylene resin composition were formed by the same method as that employed in Example 1 except that a styrene block copolymer (SEPS-1) [produced by Kuraray Co., Ltd., trade name Septon 2002] having a styrene block component content of 30% by weight was used as component (B). The thus-formed pellets were molded in a specimen by an injection molding machine, and then evaluated with respect to the flexural modulus and Izod impact strength thereof. The results obtained are shown in Table 4.

Example 4

Pellets of a reinforced polypropylene resin composition were formed by the same method as that employed in Example 1 except that ethylene-propylene copolymer rubber (EPR1) having a propylene content of 25% by weight and $ML_{1+4}$ (100° C.)=10 was used as component (B). The thus-formed pellets were molded in a specimen by an injection molding machine, and then evaluated with respect to the flexural modulus and Izod impact strength thereof. The results obtained are shown in Table 4. The reinforced polypropylene resin composition was further molded in an instrument panel and then evaluated with respect to the molding cycle, heat distortion resistance, impact resistance and appearance thereof. The results are shown in Table 6.

Example 5

Pellets of a reinforced polypropylene resin composition were formed by the same method as that employed in Example 1 except that ethylene-propylene copolymer rubber (EPR2) having a propylene content of 15% by weight and $ML_{1+4}$ (100° C.)=16 was used as component (B). The thus-formed pellets were molded in a specimen by an injection molding machine, and then evaluated with respect to the flexural modulus and Izod impact strength thereof. The results obtained are shown in Table 4.

Example 6

Pellets of a reinforced polypropylene resin composition were formed by the same method as that employed in Example 1 except that ethylene-propylene copolymer rubber having (EPR3) a propylene content of 23% by weight and $ML_{1+4}$ (100° C.)=63 was used as component (B). The thus-formed pellets were molded in a specimen by an injection molding machine, and then evaluated with respect to the flexural modulus and Izod impact strength thereof. The results obtained are shown in Table 4.

Example 7

Pellets of a reinforced polypropylene resin composition were formed by the same method as that employed in Example 1 except that ethylene-butene copolymer rubber having (EBM1) a butene content of 13% by weight and $ML_{1+4}$ (100° C.)=13 was used as component (B). The thus-formed pellets were molded in a specimen by an injection molding machine, and then evaluated with respect to the flexural modulus and Izod impact strength thereof. The results obtained are shown in Table 4.

Example 8

Pellets of a reinforced polypropylene resin composition were formed by the same method as that employed in Example 1 except that ethylene-butene copolymer rubber having (EBM2) a butene content of 20% by weight and $ML_{1+4}$ (100° C.)=15 was used as component (B). The thus-formed pellets were molded in a specimen by an injection molding machine, and then evaluated with respect to the flexural modulus and Izod impact strength thereof. The results obtained are shown in Table 4.

Comparative Example 1

Crystalline ethylene-propylene block copolymer (PP-2) having an ethylene content of 7% by weight, a molecular weight distribution ($Q=M_W/M_N$) of polypropylene component of 8.2, isotacticity of polypropylene component of 96.0%, intrinsic viscosity (decalin, 135° C.) of room temperature p-xylene soluble matter of 4 dl/g, a melt flow rate of 4 g/10 minutes, the product of room temperature flexural modulus and Izod impact strength of 10000 was used as component (A). Ethylene-propylene copolymer rubber (EPR-3) having a propylene content of 23% by weight and $ML_{1+4}$ (100° C.)=63 was used as component (B). Talc (T-4) [produced by Calseed Co., Ltd.] having an average particle size of 6 μm, BET specific surface area 4 m²/g, and a top cut size of 30 μm was used as component (C).

72% by weight of component (A), 6% by weight of component (B), 22% by weight of component (C), and an oxidizing agent were mixed by a rotary mixing machine, and then melted and kneaded by a biaxial kneading extruder to form pellets. The thus-formed pellets were molded in a specimen by an injection molding machine, and then tested in physical properties. The results obtained are shown in Table 5. The reinforced polypropylene resin composition was further molded in an instrument panel, and then evaluated with respect to the molding cycle, heat distortion resistance, impact resistance, and appearance thereof. The results are shown in Table 6.

Comparative Example 2

Pellets of a reinforced polypropylene resin composition were formed by the same method as that employed in Example 1 except that a crystalline ethylene-propylene block copolymer (PP-3) having a ethylene content of 1.5% by weight and the product of room temperature flexural modulus and Izod impact strength of 88000, which was similar to the crystalline ethylene-propylene block copolymer (PP-1) used in Example 1, was used as component (A). The thus-formed pellets were molded in a specimen by an injection molding machine, and then evaluated with respect to the flexural modulus and Izod impact strength thereof. The results obtained are shown in Table 5.

Comparative Example 3

Pellets of a reinforced polypropylene resin composition were formed by the same method as that employed in Example 1 except that a crystalline ethylene-propylene block copolymer (PP-4) having a ethylene content of 5% by weight and the product of room temperature flexural modulus and Izod impact strength of 126000, which was similar to the crystalline ethylene-propylene block copolymer (PP-1) used in Example 1. was used as component (A). The thus-formed pellets were molded in a specimen by an injection molding machine, and then evaluated with respect to the flexural modulus and Izod impact strength thereof. The results obtained are shown in Table 5. The reinforced polypropylene resin composition was further molded in an instrument panel and then evaluated with respect to the molding cycle, heat distortion resistance, impact resistance and appearance thereof. The results obtained are shown in Table 6.

Comparative Example 4

Pellets of a reinforced polypropylene resin composition were formed by the same method as that employed in Example 1 except that a crystalline ethylene-propylene block copolymer (PP-5) having a molecular weight distribution ($Q=M_W/M_N$) of polypropylene component of 4, intrinsic viscosity (decalin, 135° C.) of room temperature p-xylene soluble matter of 5, and the product of room temperature flexural modulus and Izod impact strength of 133500, which was similar to the crystalline ethylene-propylene block copolymer (PP-1) used in Example 1, was used as component (A). The thus-formed pellets were molded in a specimen by an injection molding machine, and then evaluated with respect to the flexural modulus and Izod impact strength thereof. The results obtained are shown in Table 5. The reinforced polypropylene resin composition was further molded in an instrument panel and then evaluated with respect to the molding cycle, heat distortion resistance, impact resistance and appearance thereof. The results obtained are shown in Table 6.

Comparative Example 5

Pellets of a reinforced polypropylene resin composition were formed by the same method as that employed in Example 1 except that a crystalline ethylene-propylene copolymer (PP-6) having a melt flow rate of 2 g/10 minutes, and the product of room temperature flexural modulus and Izod impact strength of 160000, which was similar to the crystalline ethylene-propylene block copolymer (PP-1) used in Example 1, was used as component (A). The thus-formed pellets were molded in a specimen by an injection molding machine, and then evaluated with respect to the flexural modulus and Izod impact strength thereof. The results obtained are shown in Table 5.

Comparative Example 6

Pellets of a reinforced polypropylene resin composition were formed by the same method as that employed in Example 1 except that a crystalline ethylene-propylene copolymer (PP-7) having a melt flow rate of 22 g/10 minutes, and the product of room temperature flexural modulus and Izod impact strength of 105000, which was similar to the crystalline ethylene-propylene block copolymer (PP-1) used in Example 1, was used as component (A). The thus-formed pellets were molded in a specimen by an injection molding machine, and then evaluated with respect to the flexural modulus and Izod impact strength thereof. The results obtained are shown in Table 5.

Comparative Example 7

Pellets of a reinforced polypropylene resin composition were formed. by the same method as that employed in Example 1 except that the ratio of component (A) was 80% by weight, the ratio of component (B) was 5% by weight, and the ratio of component (C) was 15% by weight. The thus-formed pellets were molded in a specimen by an injection molding machine, and then evaluated with respect to the flexural modulus and Izod impact strength thereof. The results obtained are shown in Table 5.

Comparative Example 8

Pellets of a reinforced polypropylene resin composition were formed by the same method as that employed in Example 1 except that the ratio of component (A) was 68% by weight, the ratio of component (B) was 10% by weight, and the ratio of component (C) was 22% by weight. The thus-formed pellets were molded in a specimen by an injection molding machine, and then evaluated with respect to the flexural modulus and Izod impact strength thereof. The results obtained are shown in Table 5.

Comparative Example 9

Pellets of a reinforced polypropylene resin composition were formed by the same method as that employed in Example 1 except that the ratio of component (A) was 70% by weight, the ratio of component (B) was 13% by weight, and the ratio of component (C) was 17% by weight. The thus-formed pellets were molded in a specimen by an injection molding machine, and then evaluated with respect to the flexural modulus and Izod impact strength thereof. The results obtained are shown in Table 5.

Comparative Example 10

Pellets of a reinforced polypropylene resin composition were formed by the same method as that employed in Example 1 except that talc (T-2) [produced by Calseed Co., Ltd.] having an average particle size of 2 μm, which was measured by the laser diffraction method, a BET specific surface area of 15 m$^2$/g, and a top cut size of 15 μm was used as component (C). The thus-formed pellets-were molded in a specimen by an injection molding machine, and then evaluated with respect to the flexural modulus and Izod impact strength thereof. The results obtained are shown in Table 5.

Comparative Example 11

Pellets of a reinforced polypropylene resin composition were formed by the same method as that employed in Example 1 except that talc (T-3) [produced by Calshid Co., Ltd.] having an average particle size of 6 μm, which was measured by the laser diffraction method, a BET specific surface area of 6 m²/g, and a top cut size of 25 μm was used as component (C). The thus-formed pellets were molded in a specimen by an injection molding machine, and then evaluated with respect to the flexural modulus and Izod impact strength thereof. The results obtained are shown in Table 5.

Comparative Example 12

Pellets of a reinforced polypropylene resin composition were formed by the same method as that employed in Example 1 except that talc (T-4) [produced by Calshid Co., Ltd.] having an average particle size of 6 μm, which was measured by the laser diffraction method, a BET specific surface area of 4 m²/g, and a top cut size of 30 μm was used as component (C). The thus-formed pellets were molded in a specimen by an injection molding machine, and then evaluated with respect to the flexural modulus and Izod impact strength thereof. The results obtained are shown in Table 5.

Comparative Example 13

Pellets of a reinforced polypropylene resin composition were formed by the same method as that employed in Example 1 except that talc (T-5) [produced by Calshid Co., Ltd.] having an average particle size of 2 μm, which was measured by the laser diffraction method, a BET specific surface area of 16 m²/g, and a top cut size of 12 μm was used as component (C). The thus-formed pellets were molded in a specimen by an injection molding machine, and then evaluated with respect to the flexural modulus and Izod impact strength thereof. The results obtained are shown in Table 5.

Comparative Example 14

Pellets of a reinforced polypropylene resin composition were formed by the same method as that employed in Example 1 except that talc (T-6) [produced by Calshid Co., Ltd.] having an average particle size of 5 μm, which was measured by the laser diffraction method, a BET specific surface area of 7 m²/g, and a top cut size of 22 μm was used as component (C). The thus-formed pellets were molded in a specimen by an injection molding machine, and then evaluated with respect to the flexural modulus and Izod impact strength thereof. The results obtained are shown in Table 5.

TABLE 4

| Items of Physical properties | Example | | | | | | | |
| --- | --- | --- | --- | --- | --- | --- | --- | --- |
| | 1 | 2 | 3 | 4 | 5 | 6 | 7 | 8 |
| Component (A) | PP-1 | PP-1 | PP-1 | PP-1 | PP-1 | PP-1 | PP-1 | PP-1 |
| Type Ratio (wt %) | 73 | 73 | 73 | 73 | 73 | 73 | 73 | 73 |
| Component (B) | SEBS-1 | SEBS-2 | SEPS-1 | EPR-1 | EPR-2 | EPR-3 | EBM-1 | EBM-2 |
| Type Ratio (wt %) | 10 | 10 | 10 | 10 | 10 | 10 | 10 | 10 |
| Component (C) | T-1 | T-1 | T-1 | T-1 | T-1 | T-1 | T-1 | T-1 |
| Type Ratio (wt %) | 17 | 17 | 17 | 17 | 17 | 17 | 17 | 17 |
| MFR (g/10 min.) | 6.0 | 5.2 | 6.5 | 5.8 | 5.9 | 6.1 | 5.2 | 5.2 |
| Density (g/cm³) | 1.03 | 1.03 | 1.03 | 1.03 | 1.03 | 1.03 | 1.03 | 1.03 |
| Flexural modulus (kg/cm²) | 24200 | 23500 | 24200 | 24100 | 24100 | 24100 | 24500 | 24100 |
| Heat distortion temperature (°C.) | 133 | 131 | 133 | 133 | 133 | 132 | 135 | 133 |
| Izod impact strength (kg · cm/cm) | 30 | 35 | 30 | 31 | 30 | 33 | 30 | 33 |

TABLE 5

| Items of Physical properties | Comparative Examples | | | | | | |
| --- | --- | --- | --- | --- | --- | --- | --- |
| | 1 | 2 | 3 | 4 | 5 | 6 | 7 |
| Component (A) | PP-2 | PP-3 | PP-4 | PP-5 | PP-6 | PP-7 | PP-1 |
| Type Ratio (wt %) | 72 | 73 | 73 | 73 | 73 | 73 | 80 |
| Component (B) | EPR-3 | SEBS-1 | SEPS-1 | SEBS-1 | SEBS-1 | SEBS-1 | SEBS-1 |
| Type Ratio (wt %) | 6 | 10 | 10 | 10 | 10 | 10 | 5 |
| Component (C) | T-1 | T-1 | T-1 | T-1 | T-1 | T-1 | T-1 |
| Type Ratio (wt %) | 22 | 17 | 17 | 17 | 17 | 17 | 15 |
| MFR (g/10 min.) | 3.3 | 4.8 | 4.8 | 4.8 | 1.1 | 6.5 | 3.5 |

TABLE 5-continued

| Items of Physical properties | Comparative Examples | | | | | | |
|---|---|---|---|---|---|---|---|
| Density (g/cm³) | 1.07 | 1.03 | 1.03 | 1.03 | 1.03 | 1.03 | 1.01 |
| Flexural modulus (kg/cm²) | 22100 | 26000 | 20500 | 24500 | 25000 | 24500 | 25000 |
| Heat distortion temperature (°C.) | 125 | 135 | 124 | 134 | 133 | 135 | 136 |
| Izod impact strength (kg · cm/cm) | 30 | 15 | 40 | 28 | 40 | 25 | 21 |

| | 8 | 9 | 10 | 11 | 12 | 13 | 14 |
|---|---|---|---|---|---|---|---|
| Component (A) | PP-1 | PP-1 | PP-1 | PP-1 | PP-1 | PP-1 | PP-1 |
| Type Ratio (wt %) | 68 | 70 | 73 | 73 | 73 | 73 | 73 |
| Component (B) | SEBS-1 | SEBS-1 | SEBS-1 | SEBS-1 | SEBS-1 | SEBS-1 | SEBS-1 |
| Type Ratio (wt %) | 10 | 13 | 10 | 10 | 10 | 10 | 10 |
| Component (C) | T-1 | T-1 | T-2 | T-3 | T-4 | T-5 | T-6 |
| Type Ratio (wt %) | 22 | 17 | 17 | 17 | 17 | 17 | 17 |
| MFR (g/10 min.) | 4.6 | 5.9 | 4.8 | 4.8 | 4.8 | 4.8 | 4.6 |
| Density (g/cm³) | 1.07 | 1.03 | 1.03 | 1.03 | 1.03 | 1.02 | 1.03 |
| Flexural modulus (kg/cm²) | 26300 | 21600 | 22000 | 22500 | 22500 | 20200 | 24000 |
| Heat distortion temperature (°C.) | 135 | 123 | 129 | 130 | 130 | 125 | 129 |
| Izod impact strength (kg · cm/cm) | 20 | 37 | 24 | 20 | 22 | 18 | 20 |

TABLE 6

Evaluation results of actual performance of instrument panel molded product

| Items | Example 1 | Example 4 | Comparative Example 1 | Comparative Example 3 | Comparative Example 4 |
|---|---|---|---|---|---|
| Molding cycle (sec.) | ⊙ 76 | ⊙ 79 | x 88 | ⊙ 76 | ⊙ 76 |
| Heat distortion resistance test* Portion A (mm) | ⊙ 1.2–1.8 | ⊙ 1.2–1.8 | x 2.8–3.1 | x 3.0–3.3 | x — |
| Portion B (mm) | 2.4–2.8 | 2.4–2.8 | 3.0–3.6 | 3.2–3.5 | — |
| Impact resistance test | Passing Length of crack on the back, 45 mm | Passing, Length of crack on the back, 45 mm | Passing, Length of crack on the back, 60 mm | — | Failure, Length of crack on the back, 70 mm |
| Appearance of moded product flow mark surface distortion etc. | ⊙ ⊙ | ⊙ ⊙ | x x | x x | x x |

⊙: good, x: poor
*Portion A: garnish portion
Portion B: central portion of instrument panel Even if the melt flow rate is 5 g/10 minutes or more, the reinforced polypropylene resin composition of the present invention hardly produces appearance defects such as flow marks and so oh when a large molded product such as an automobile instrument panel is formed by injection molding. The resin composition also has a specific gravity of as small as 1.03 or less, excellent flexural modulus of 23500 kg/cm² or more, and high Izod impact strength of 30 kg.cm/cm or more. The heat distortion temperature is 130° C. or more. The use of the reinforced polypropylene resin composition of the present invention permits the formation of an instrument panel having sufficient heat distortion resistance, impact resistance and dimensional stability, a light weight and excellent appearance.

What is claimed is:

1. A reinforced polypropylene resin composition comprising the following components (A), (B) and (C) in amounts of 67 to 82% by weight 6 to 10% by weight and 12 to 21% by weight, respectively, wherein:

Component (A) is:

Crystalline ethylene-propylene block copolymer having an ethylene content of 2 to 4% by weight, a molecular distribution of polypropylene component ($Q=M_w/M_n$) of at least 7, isotacticity of polypropylene component of at least 98%, an intrinsic viscosity (decalin, 135° C.) of room temperature p-xylene soluble content of more than 7 dl/g, a melt flow rate (MFR) of 3 to 15 g/10 minutes, and the product of flexural modulus at room temperature and Izod impact strength at room temperature of at least 120000;

Component (B) is:

At least one elastomer selected from the group of consisting of (a) hydrogenated block copolymer rubbers each comprising block (I) composed of an aromatic vinyl compound copolymer and block (II) composed of a conjugated diene copolymer, and having a bonding structure of I-II or I-(II-I)$_n$ (wherein n-1 or 2), wherein block (I) is contained in an amount of 10 to 40% by weight of the copolymer and is hydrogenated in an amount of 10 mol % or less, and block (II) is contained in an amount of 60 to 90% by weight of the copolymer and is hydrogenated in an amount of at least 90 mol %; and (b) ethylene-α-olefin copolymer-rubbers each containing 30 to 95% by weight of ethylene; and Component (C) is:

talc having an average particle size of 3–5 µm, which is measured by a laser diffraction method, a BET specific surface area of 5 to 113 m²/g, and a top cut size of less than 20 µm.

2. A reinforced polypropylene resin composition according to claim 1, wherein block (I) of the component (B) comprises at least one polymer selected from the group consisting of polystyrene, poly-α-methylstyrene, poly-p-methylstyrene, polybromostyrene and polychlorostyrene.

3. A reinforced polypropylene resin composition according to claim 1, wherein block (II) of the component (B) comprises at least one selected from the group consisting of polybutadiene, polyisoprene and polychloroprene.

4. A reinforced polypropylene resin composition according to claim 1, wherein the ethylene-α-olefin copolymer rubbers of the component (B) contains 60 to 90% by weight of ethylene.

5. A reinforced polypropylene resin composition according to claim 1, wherein the talc of the component (C) is subjected to surface treatment with surface treatment agents.

6. A reinforced polypropylene resin composition according to claim 1, wherein the components (A), (B) and (C) are in the ranges of 71 to 78% by weight, 6 to 10% by weight, and 15 to 20% by weight, respectively.

7. A reinforced polypropylene resin composition according to claim 1, further comprising an antioxidant, an ultraviolet absorber, a light stabilizer, and a pigment.

8. A reinforced polypropylene resin composition according to claim 1, wherein the intrinsic viscosity (decalin, 135° C.) of room temperature p-xylene soluble content of Component A is at least 8 dl/g.

9. A resinous composition comprising:

a reinforced polypropylene resin composition consisting essentially of the following components (A), (B) and (C) in amounts of 67 to 82% by weight 6 to 10% by weight and 12 to 21% by weight, respectively, wherein:

Component (A) is:

Crystalline ethylene-propylene block copolymer having an ethylene content of 2 to 4% by weight, a molecular distribution of polypropylene component ($Q=M_w/M_n$) of at least 7, isotacticity of polypropylene component of at least 98%, an intrinsic viscosity (decalin, 135° C.) of room temperature p-xylene soluble content of more than 7 dl/g, a melt flow rate (MFR) of 3 to 15 g/10 minutes, and the product of flexural modulus at room temperature and Izod impact strength at room temperature of at least 120000;

Component (B) is:

At least one elastomer selected from the group of consisting of (a) hydrogenated block copolymer rubbers each comprising block (I) composed of an aromatic vinyl compound copolymer and block (II) composed of a conjugated diene copolymer, and having a bonding structure of I-II or I-(II-I)$_n$ (wherein n–1 or 2), wherein block (I) is contained in an amount of 10 to 40% by weight of the copolymer and is hydrogenated in an amount of 10 mol % or less, and block (II) is contained in an amount of 60 to 90% by weight of the copolymer and is hydrogenated in an amount of at least 90 mol %; and (b) ethylene-α-olefin copolymer-rubbers each containing 30 to 95% by weight of ethylene; and Component (C) is:

talc having an average particle size of 3–5 µm, which is measured by a laser diffraction method, a BET specific surface area of 5 to 113 m²/g, and a top cut size of less than 20 µm; and Component (D) comprising at least one additive selected from the group consisting of an antioxidant, an ultraviolet absorber, a light stabilizer and a pigment.

* * * * *